Patented Aug. 8, 1950

2,517,856

UNITED STATES PATENT OFFICE 2,517,856

METHOD OF PREPARING DIPHENYL ACETIC ACID

Herbert R. Elkinton, Orangeburg, George Kesslin, New York, and Leonard Nicholl, Nyack, N. Y., assignors to Kay-Fries Chemicals, Inc., West Haverstraw, N. Y., a corporation of New York No Drawing. Application May 12, 1949, Serial No. 92,968

2 Claims. (Cl. 260—515)

This invention relates to improvements in methods of preparing diphenyl acetic acid, and, more particularly, to the use of chloral as a basic starting material with the optional formation of diphenyl trichlorethane, or glyoxylic acid, as intermediate compounds, which are separately elaborated to form diphenyl acetic acid.

Diphenyl acetic acid is an important intermediate or starting compound for the preparation of a number of special chemicals having particular utility as bacteriostats in the treatment of malaria and like diseases.

The methods available for the preparation of diphenyl acetic acid are costly and time consuming, as well as requiring special, high priced chemicals, which are in relatively short supply. Among these prior art chemicals which have been used for starting materials are benzil, benzoin, and diphenyl methane.

When benzil is used, it is heated in strong sodium hydroxide to form benzilic acid sodium salt, which is acidified with hydrochloric acid to form benzilic acid. The latter compound is reacted, in glacial acetic acid solution, with phosphorous and iodine as catalysts, to give diphenyl acetic acid.

When using benzoin as a starting material, the benzilic acid sodium salt is formed by reacting benzoin and sodium bromate in strongly alkaline solution. The sodium salt is acidified with hydrochloric acid to form benzilic acid, which is reacted with phosphorus and iodine in glacial acetic acid solution to give diphenyl acetic acid.

In the use of diphenyl methane, this compound is first prepared by reacting benzene and benzyl chloride in the presence of aluminum chloride. The diphenyl methane is reacted with sodium phenyl to give diphenyl methyl sodium and benzene. The diphenyl methyl sodium is recovered and carbonated with carbon dioxide to give diphenyl acetic acid sodium salt, which is acidified with hydrochloric acid to give diphenyl acetic acid.

Considering the procedures outlined above, it is noted that with benzil, strong caustic is used, and with benzoin, strong caustic and sodium bromate are used. None of these procedures are conveniently carried out on a practical, commercial scale. Additionally, the reduction of benzilic acid in glacial acetic acid solution, using phosphorous and iodine, is not only commercially difficult, but introduces appreciable hazards in the handling of the reagents. In the method involving diphenyl methane, it is to be noted that sodium phenyl is required to be prepared. This compound is difficult to handle under any conditions, and the organo-metal compound, diphenyl methyl sodium is not conveniently worked with.

The available procedures of the prior art are industrially impractical, as well, from technical grounds, as from the standpoint of high cost of starting materials, equipment and time.

It has now been found that the prior art difficulties in the preparation of diphenyl acetic acid on a commercial scale can be essentially overcome by the improvements of the present invention, which involve the use of chloral as a basic starting material from which diphenyl trichlorethane can be prepared, and elaborated to form the diphenyl acetic acid. In the case of diphenyl trichlorethane, it is hydrolyzed with caustic soda, the reaction being carried out in a special solvent, to form the sodium salt of diphenyl acetic acid, which is recovered and acidified.

It is, therefore, among the features of novelty and advantage of the present invention, to provide novel methods for the preparation of diphenyl acetic acid using chloral as a basic starting material, and utilizing intermediates prepared therefrom, including diphenyl trichlorethane prepared directly from the chloral, and treated to secure the desired diphenyl acetic acid.

A further feature of novelty and advantage of the present invention includes the special treatment of diphenyl trichlorethane in diethylene glycol solution with caustic soda, and at atmospheric pressure, to form the diphenyl acetic acid sodium salt which is recovered and acidified to give the diphenyl acetic acid.

Other features of novelty and advantage include the use of chlorsulphonic acid as a reactant; the carrying out of multiple reactions in one step; the elimination of the requirement for working under pressure; and a marked reduction of the reaction time.

Considering the improved methods herein, the preparation of diphenyl acetic acid from chloral will be described with reference to the formation and use of diphenyl trichlorethane as an intermediate compound. The reactions involved include the following:

(1)

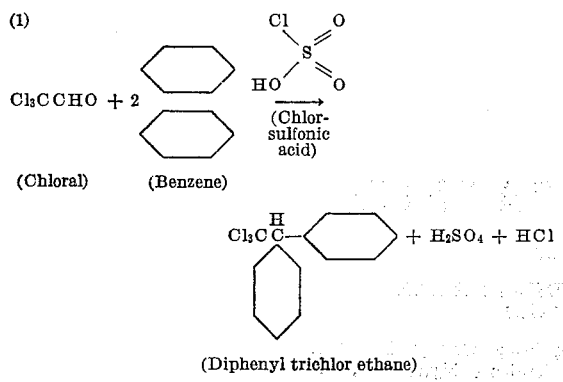

(2)

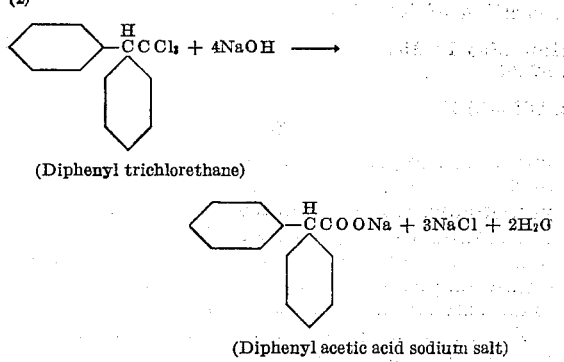

(3)

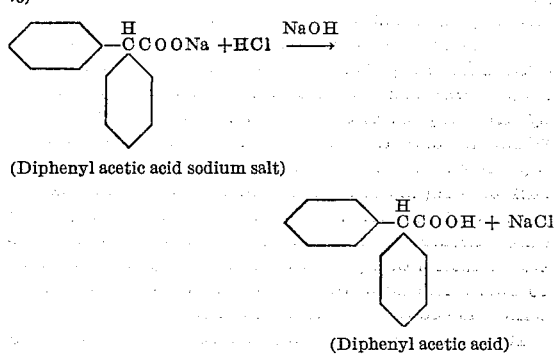

A particular feature of the present invention is the reacting of the diphenyl trichlorethane with either KOH or NaOH in diethylene glycol solution. As will appear more fully hereinafter, the behavior of diethylene glycol is unique as compared with other alcohols. It will be noted further that homologous alcoholic bodies, such as ethylene glycol and triethylene glycol, do not give comparable results under identical operating conditions. Glycerol is found to be wholly unsuited for use in the process herein, apparently because of the fact the diphenyl trichlorethane is not soluble therein. The unique and hitherto unexplained behavior of diethylene glycol will be more full appreviated by reference to the tables herein in which the results of using other alcohols, under identical conditions with diethylene glycol, are more fully set out.

The preparation of the diphenyl acetic acid is carried out as follows:

Step I.—Condensation

Materials.—774 gms. $ClSO_3H$ (6.6 mols) (430 cc.); 655 gms. benzol (8.4 mols) 40% excess; 496½ gms. chloral (3 mols).

Theory yield.—856 gms. diphenyl trichlorethane diphenyl trichlorethane.

Actual yield.—816 gms. diphenyl trichlorethane (95.4% yield).

Procedure.—The chloral and benzene are loaded into a 2 liter, 3-necked flask, mounted in a water bath and equipped with agitator, reflux condenser, thermometer and addition funnel. $ClSO_3H$ is added to the reagents, over a period of one hour and ten minutes, while the reaction mixture is held at a temperature of 25–30° C. After the addition of the chlorsulfonic acid is completed, the temperature of the reaction mixture is allowed to rise to 35°, and held there, by intermittent cooling, for another hour. The reaction mixture is then heated to 50–55° C., and held within this temperature range for a three hour period. The reaction mixture separates into two layers: a bottom, sulphuric acid layer, and an upper, supernatant benzene-product layer. The sulphuric acid layer (lower) is drawn off, leaving the supernatant benzene-product layer, which is loaded into a 2 liter flask (1900 cc. water added), and the benzene distilled off. 400 gms. of NaCl is added to the residue (diphenyl trichlorethane) in the flask, and the mixture heated to 60–70° C. to melt the diphenyl trichlorethane. On cooling, with agitation, the DTE comes down in medium size granules that are easily filtered and washed. The filter cake is washed well with water to remove as much acid as possible. An alternative method for isolating the product would be to separate the product layer from the water after heating to 60–70° C., and allow the diphenyl trichlorethane to solidify. An analysis of the diphenyl trichlorethane is required for use in the following step.

Results.—Weight of diphenyl trichlorethane made, 816 gms., 95.4% yield.

Step II.—Hydrolysis

Materials.—

285.5 gms. diphenyl trichlorethane (from step I after drying).
748 gms. (670 cc.) diethylene glycol.
219 gms. 97.3% NaOH—5.33 mols.
1000 cc. water.
260 gms. of 35% HCl (220 cc.) or the equivalent amount of $H_2SO_4$.
1450 gms. water.
300 cc. solvent naptha (B. P. 150°–200° C.)
5 gms. activated carbon.
41.2 gms. 97.3% NaOH percent (equivalent to the original diphenyl acid).
101.5 gms. (85.8 cc.) 35% HCl, or the equivalent amount of $H_2SO_4$.

Theory yield.—212 gms. diphenyl acetic acid.

Actual yield.—148.5 g. diphenyl acetic acid=approximately 74.5% of 99% diphenyl acetic acid—light tan powder.

Procedure.—The NaOH and diethylene glycol are loaded into a 2 liter 3-necked flask, equipped with agitator, thermometer and reflux condenser. The mixture is heated to 155° C. to effect solution of the NaOH in the diethylene glycol. The resulting solution is then cooled to about 100° C., and the DTE loaded in all at once. This reaction mixture is heated to reflux temperature (approximately 160° C.), and maintained at 155–160° C., for a period of nine hours, to form diphenyl acetic acid sodium salt. Intermittent removal of water may be necessary to keep the liquid temperature at 155° to 160° C. At the end of this period the reaction mixture is diluted with 1000 cc. of water, to dissolve all the salts, and reduce the temperature of the bath to about 70° C. Then the reaction mixture is acidified with concentrated HCl (220 cc.), or conc. H₂SO₄, to acidify the sodium salt and liberate diphenyl acetic acid. When agitation has caused the diphenyl acetic acid formed to break up into a coarse precipitate, the mixture is filtered, and washed well with water. The wet diphenyl acetic acid filter cake (containing about 30% water) is loaded into 1450 cc. water, containing NaOH, with stirring. This mixture is heated to 60° C. to dissolve the diphenyl acetic acid. The water solution is then extracted with 2-150 cc. portions of solvent naptha. After the second extraction the activated carbon is added to the water layer, the mixture is heated while being blown with air. The activated carbon is then filtered off, and the water solution acidified with concentrated HCl or H₂SO₄, under agitation. The resulting diphenyl acetic acid is filtered, after cooling to approximately 20°–30° C., and washed well with water.

*Results.*—Weight of diphenyl acetic acid made=approximately 148½ gms. (99% pure)—light tan powder. Melting point=144.4°–146.4°–147.0° C.

The test data which follows is based on the hydrolysis of diphenyl trichlorethane, using diethylene glycol as a solvent, at atmospheric pressure, as compared with homologous alcohols and with ethyl alcohol, which, according to the literature, is the preferred solvent used in the hydrolysis of diphenyl trichlorethane. It is noted that when ethanol is used as a solvent, pressure vessels and extended reaction periods are required.

NaOH suspended as flocculent solid during course of reaction.

(e) 60 g. of 85.0% KOH and 20.0 g. diphenyl trichlorethane were added to 500 cc. solvent.

(f) In these examples there was poor contact between reactants due to low solubility of one or the other in the solvent.

(g) 35 g. diphenyl trichlorethane in 198 g. cyclohexanol, 41.2 g. KOH used in experiment.

From the above data, it will be seen that the use of diethylene glycol (boiling range of 230–270° C.), permits the hydrolysis reaction of diphenyl trichlorethane, at atmospheric pressure and at reaction temperatures of 150–160° C., over a time period of 4–6 hours, as against reaction conditions of 110 p. s. i. required when ethanol is used.

The procedure outlined above can be modified, without appreciable loss of efficiency, by adding the diphenyl trichlorethane solution gradually to the diethylene glycol solution of caustic soda, as is shown by the following test run:

*Step I.—Condensation*

*Materials.—*
328 g. benzol (40% excess).
233 g. 95% chloral (222 g. pure material).
193 g. ClSO₃H (10% excess).

*Theoretical yield.*—427 g. diphenyl trichlorethane.

*Expected yield.*—405 g. diphenyl trichlorethane (95.0% yield).

*Procedure.*—The chloral and benzene are loaded into a one liter 3-necked flask, mounted in a water bath, and equipped with agitator, reflux

| | Solvent | Absolute Yield diphenyl acetic acid | Alkali Excess | Reaction Temp. | Reaction Time | Pressure |
|---|---|---|---|---|---|---|
| | | Per cent | Per cent | °C. | Hours | |
| 1. | Diethylene Glycol | 78.9 | 55.8 | 150–155 | 4½ | Atm. |
| 2. | Triethylene Glycol | 30.8 | 55.8 | 150–160 | 4½ | Do. |
| 3. | butyl ether of ethylene glycol | 10.6 | 55.8 | 150–160 | 4½ | Do. |
| 4. | Glycerol (f) | 0 | 55.8 | 150–160 | 4½ | Do. |
| 5. | Ethyl Alcohol | 0 | 55.8 | 150–160 | 5 | 110 p. s. i. |
| 6. | N-Amyl Alcohol (f) | 0 | 55.8 | 145 | 4 | Atm. |
| 7. | N-Butyl Alcohol (f) (a) | 0 | 55.8 | 145 | 8 | Do. |
| 8. | Capryl Alcohol (f) | 0 | 55.8 | 150–160 | 9 | Do. |
| 9. | Diethylene Glycol | 75.6 | 100.0 | 150–160 | 4½ | Do. |
| 10. | Triethylene Glycol | 38.2 | 100.0 | 150–160 | 4½ | Do. |
| 11. | Ethylene Glycol (f) | 3.0 | 100.0 | 150–160 | 4½ | Do. |
| 12. | butyl ether of ethylene glycol | 7.2 | 100.0 | 150–160 | 4½ | Do. |
| 13. | Ethyl Alcohol | 26.0 | 100.0 | 150–160 | 10 | 110 p. s. i. |
| 14. | IsoButanol (b) | 0 | 63.1 | 150–160 | 6 | 20–25 p. s. i. |
| 15. | IsoButanol (c) | 33.6 | 69.5 | 180–190 | 6 | 100 p. s. i. |
| 16. | solvent naptha (d) (f) | 0 | 95.0 | 150–160 | 11½ | Atm. |
| 17. | Ethyl Alcohol (e) | 42.5 | 225.0 | 150–160 | 36 | 110 p. s. i. |
| 18. | Cyclohexanol (g) | 11.4 | 50.0 | 158 | 6½ | Atm. |

*Reagents used.*—In Examples 1–8, 61.8 g. of 85% KOH was added to 300 cc. solvent and 42.9 g. diphenyl trichlorethane was added after solution was effected. Exception as noted. In Examples 9–13, 49.5 g. of 97.3% NaOH was added to 300 cc. solvent and 43.0 g. diphenyl trichlorethane was added after solution was effected. Exceptions as noted:

(a) 32.8 g. of 85% KOH and 22.8 g. diphenyl trichlorethane were added to 300 cc. solvent due to low solubility of KOH in N-butanol.

(b) 53.5 g. of 85.0% KOH and 35.5 g. diphenyl trichlorethane were added to 500 cc. solvent.

(c) 56.5 g. of 85.0% KOH and 36.0 g. diphenyl trichlorethane were added to 400 cc. solvent. Not all of KOH was in solution.

(d) 67.0 g. of 97.3% NaOH and 59.7 g. diphenyl trichlorethane were added to 300 cc. solvent.

condenser, thermometer, addition funnel, and exhaust line from the condenser to carry away evolved HCl. The ClSO₃H is added over a one hour period, the reaction mixture being held at a temperature of 25–30° C. After addition of the ClSO₃H is completed, the temperature of the reaction bath is allowed to rise (spontaneously) to 35°–40° C., being held there, with intermittent cooling, for another hour. It is then brought up to 150–155° C., and heated for another hour. Total reaction time is 3 hours. Upon completion of the reaction, 37 g. H₂O is added slowly to the mixture, to dilute the H₂SO₄ of reaction to about 80%. Cooling will be necessary to keep the temperature between 50° and 55° C. The batch weight at this point is about 735 g., the volume being 560 cc. The reaction mixture then separates into two layers, a bottom acid layer, and a supernatant benzene-product layer. The acid layer is drawn off and the excess benzene is then stripped off from the residuum, under the best vacuum possible (30-40 mm.) at a maximum liquid temperature of 60° C. 215 g. benzene is then added to the residual batch and agitated to insure a uniform mixture More acid is allowed to settle out and is separated off from the benzene solution of diphenyl trichlorethane.

*Results.*—Weight of diphenyl trichlorethane solution—624 g. Analysis, diphenyl trichlorethane 65.0%; acid .2-.3%. Yield of diphenyl trichlorethane—405 g. or 95.0%.

Step II.—Hydrolysis

*Materials.*—

285.5 gms. diphenyl trichlorethane (65% solution in benzene).
748 gms. (670 cc.) diethylene glycol.
219 gms. 97.3% NaOH (33⅓% excess).
1000 cc. $H_2O$ for 1.5/1 dilution.
260 gms. 35% HCl or the equivalent amount of $H_2SO_4$.
1450 gms. $H_2O$.
450 cc. benzol.
5 gms. activated carbon.
42 gms. 97.3% NaOH.
101 gms. 35% HCl or equivalent amount of $H_2SO_4$.

*Theoretical yield.*—212 g. of diphenyl acetic acid.

*Expected yield.*—150 g. or approximately a 70-71% yield.

*Procedure.*—The NaOH and diethylene glycol are loaded into a two liter 3-necked flask equipped with thermometer, addition funnel, efficient agitator, distilling column with cold spot or other device to control the take off. The mixture is heated to 155° C., and then the diphenyl trichlorethane solution is started in. Benzene and water will distill out. The rate of addition, heat input, and rate of distillation, are balanced so that the addition takes about one hour, and the liquid temperature is maintained between 155–160° C. The batch is then refluxed for 5 hours after addition of the reagents is completed. Upon completion of the reaction, the reaction mixture is diluted with 1000 cc. of water and cooled. It is then acidified, the crude diphenyl acetic acid filtered off, and washed well with water. About 750 to 1000 cc. of water should be used on the wash, the first 150 to 200 cc. of wash water being added to the mother liquor, and the remaining washes kept separate and discarded. The wet diphenyl acetic acid filter cake (containing about 30% water) is loaded into 1450 cc. $H_2O$ containing 42 g. NaOH and agitated for about one half hour. The solution should be checked at this time to determine if it is still alkaline. If not, more caustic must be added. The water solution of the sodium salt of the acid is then extracted with three 150 cc. portions of benzene. After the third extraction, activated carbon is added, and the mixture blown with air, at 65–75° C., for about one half hour to one hour, to remove residual benzene from the washes. The activated carbon is then filtered off, the water solution acidified with $H_2SO_4$, under agitation, and cooled. The diphenyl acetic acid is filtered off and washed with water and dried.

*Results.*—Weight of diphenyl acetic acid made: approx. 150 g. (99.5% pure or better).

It will now be appreciated that there have been disclosed novel methods for the preparation of diphenyl acetic acid from chloral as a basic starting agent, and which methods include, inter alia, the preparation of diphenyl trichlorethane as an intermediate, which is dissolved in diethylene glycol solution of caustic soda, and reacted at 150–160° C., at atmospheric pressure, for a relatively short period, to hydrolyze the diphenyl trichlorethane to the sodium salt of diphenyl acetic acid, which is separated, and then acidified, to give the desired end product, diphenyl acetic acid in pure form and high yield.

What is claimed is:

1. The method of hydrolyzing diphenyl trichlorethane to form the alkali salt of diphenyl acetic acid, comprising dissolving a unit charge of diphenyl trichlorethane in an excess of alkali dissolved in diethylene glycol, and reacting the mixture at 150–155° C. for a time period of 4½ hours and at atmospheric pressure.

2. The method of hydrolyzing diphenyl trichlorethane to form alkali salts of diphenyl acetic acid, comprising dissolving a unit charge of 42.9 g. of DTE in an alkali-glycol solution comprised of 61.8 g. KOH and 300 cc. of diethylene glycol, and reacting the mixture at 150–155° C., for a time period of 4½ hours and at atmospheric pressure.

HERBERT R. ELKINTON.
GEORGE KESSLIN.
LEONARD NICHOLL.

REFERENCES CITED

The following references are of record in the file of this patent:

Baeyer, Beilstein (Handbuch, 4th ed.), vol. 5, pp. 606 (1922).

Harris et al., Beilstein (Handbuch, 4th ed.), 2nd Suppl., vol. 5, p. 510 (1942).

Gatzi et al., Chem. Abstracts, vol. 40, Col. 5040 (1946).